(12) United States Patent
Niyagawa et al.

(10) Patent No.: US 8,384,798 B2
(45) Date of Patent: Feb. 26, 2013

(54) IMAGING APPARATUS AND IMAGE CAPTURING METHOD

(75) Inventors: Kazuya Niyagawa, Kanagawa (JP); Yuuji Kasuya, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 168 days.

(21) Appl. No.: 13/035,090

(22) Filed: Feb. 25, 2011

(65) Prior Publication Data

US 2011/0216222 A1 Sep. 8, 2011

(30) Foreign Application Priority Data

Mar. 2, 2010 (JP) ................................ 2010-045629

(51) Int. Cl.
*H04N 5/225* (2006.01)
(52) U.S. Cl. .................................................... 348/222.1
(58) Field of Classification Search ................ 348/222.1
See application file for complete search history.

(56) References Cited

U.S. PATENT DOCUMENTS

| | | | |
|---|---|---|---|
| 2005/0265626 A1* | 12/2005 | Endo et al. | 382/274 |
| 2008/0063254 A1* | 3/2008 | Tanizaki et al. | 382/141 |
| 2008/0204565 A1* | 8/2008 | Yumiki | 348/208.99 |

FOREIGN PATENT DOCUMENTS

| | | |
|---|---|---|
| JP | 4154400 | 7/2008 |
| JP | 2011-19013 | 1/2011 |

* cited by examiner

*Primary Examiner* — James Hannett
(74) *Attorney, Agent, or Firm* — Oblon, Spivak, McClelland, Maier & Neustadt, L.L.P.

(57) ABSTRACT

An imaging apparatus includes an acquisition unit; a filter unit carrying out average differential filtering for image data acquired; a face area detection unit which detects the face area of the subject from image data subjected to average differential filter by the filter unit on the basis of the feature quantity stored; a focusing unit carrying out focusing control to be focused on the face area when the face area of the subject is detected; an image capturing unit capturing an image focused on the face area as a still image when the face area of the subject is detected; and a shutter speed control unit, when the face area of the subject is detected, increasing a shutter speed during the focusing control and during capturing the still image compared to a shutter speed when the face area of the subject is not detected.

10 Claims, 13 Drawing Sheets

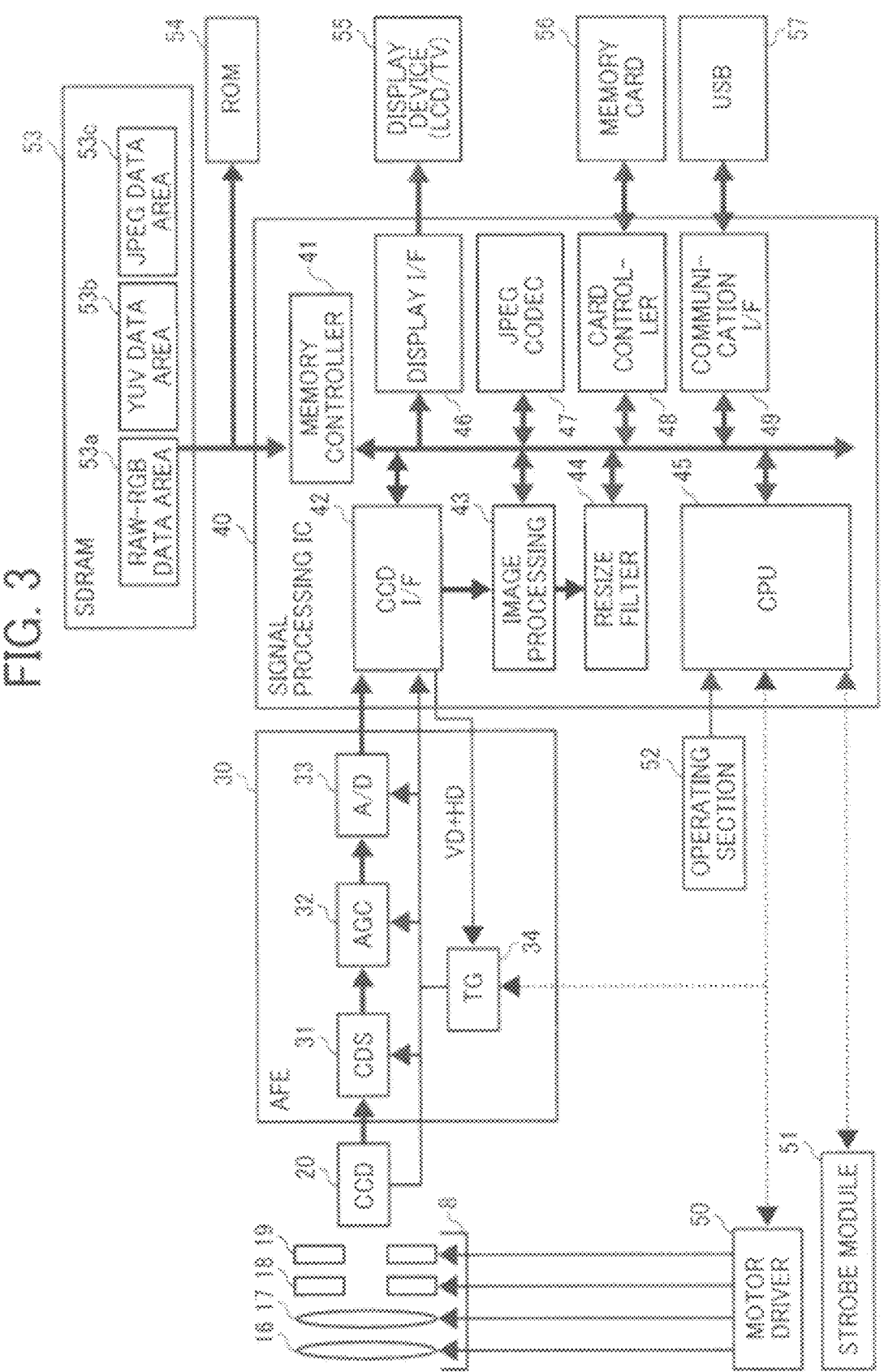

IMAGING APPARATUS AND IMAGE CAPTURING METHOD

CROSS-REFERENCE TO RELATED APPLICATIONS

The present application claims priority to and incorporates by reference the entire contents of Japanese Patent Application No. 2010-045629 filed in Japan on Mar. 2, 2010.

BACKGROUND OF THE INVENTION

1. Field of the Invention

The present invention relates to an imaging apparatus having a function of detecting a face area of a subject and an image capturing method.

2. Description of the Related Art

In recent years, it is well known that an animal (pet), such as a dog or a cat lives in an increasing number of homes, and with the spread of a digital camera or the like, there is natural demand for photographing a pet by the digital camera and recording the photographing result as an image (photograph). However, practically, it is not easy to photograph the pet successfully. From among many shots, it is very difficult to take the photograph of the front face of the pet. This is because the pet may not turn the face (front) toward the camera as intended, unlike a person.

On the other hand, in the related art, a technique is known in which an imaging apparatus, such as a digital camera, detects the face of a person and determines focus, exposure, white balance, and the like in accordance with the face of the person. For example, Japanese Patent No. 4154400 describes a photographing apparatus which detects the position of the face of a person in a screen, focuses on the face of the person, and carries out photographing at an optimal exposure for the face of the person, taking a good-looking photograph focused on the face of the person. In photographing a person with a photographing apparatus, such as a digital camera, in order to carry out photographing at the optimum exposure for the face of the person as a main subject, it is required to focus the photographing apparatus on the face of the person as a main subject (that is, to accurately detect the position of the face of the person). The invention described in Japanese Patent No. 4154400 can provide a photographing apparatus which is capable of detecting the AF/AE/WB evaluation value for the image of a frame serving as an object of a face area detection, accurately performing focus adjustment and exposure control on the face of the person and being resistant to the motion of the person or shaking.

For example, in taking the photograph (still image) of the front face of a pet with the above-described digital camera, it is considered that, if the shutter is depressed when the face position of the pet in an LCD monitor is detected, the face photograph of the face of the pet can be taken clearly. However, in the digital camera using face detection of the related art, it is assumed that the face of a person is detected thoroughly. For this reason, it is difficult to accurately detect the face of the pet and consequently, it is difficult to focus the digital camera on the face of the pet and to skillfully carry out photographing at the optimum exposure or the like for the face of the pet. That is, the face of a person is recognized from an image to detect the face, and the face of a pet cannot be recognized. This is because the face of a pet is different from the face of a person and has particularly various colors, such as white, black, brown, a mottled pattern, and a stripe pattern. In many cases, the body of a pet has the same color or pattern as the face. Thus, in the digital camera using the face detection technique of the related art, since it is attracted to color or pattern, it is difficult to appropriately recognize the face of a pet from an image.

The vicinity of the face of the pet is continuously targeted within the LCD monitor, and even when the face of the pet is temporarily detected, the pet does not keep the face toward the camera in the front direction. When the shutter is depressed, if the pet already turns the face in the lateral direction, it is very difficult to photograph successfully a quickly moving pet from the front.

In appropriately photographing a strenuously moving pet as a still image, even when the pet is moving, it is desirable to carry out photographing in accordance with the setting in which the digital camera is accurately focused on the face position of the pet. In the digital camera of the related art, however, it may be impossible to carry out photographing under the conditions suitable for photographing the pet. For this reason, it is difficult to appropriately capture an image focused on the face of the pet photograph as a still image. In carrying out photographing under the conditions suitable for photographing the pet, it is necessary that the user carries out an operation to manually set the shutter speed, the aperture value, and the like, causing complexity of the operation.

SUMMARY OF THE INVENTION

It is an object of the present invention to at least partially solve the problems in the conventional technology.

According to an aspect of the present invention, there is provided an imaging apparatus including: an acquisition unit which acquires image data including a subject; a filter unit which carries out average differential filtering for the image data acquired by the acquisition unit; a storage unit which stores a feature quantity calculated from data obtained by the average differential filtering for face image data of a subject of the same kind as the subject in advance; a face area detection unit which detects the face area of the subject from image data subjected to average differential filter by the filter unit on the basis of the feature quantity stored in the storage unit; a focusing unit which, when the face area of the subject is detected, carries out focusing control to be focused on the face area; and an image capturing unit which, when the face area of the subject is detected, captures an image focused on the face area as a still image; and wherein a shutter speed control unit is provided with the imaging apparatus, when the face area of the subject is detected by the face area detection unit, for increasing a shutter speed during the focusing control and during capturing the still image compared to a shutter speed when the face area of the subject is not detected.

According to another aspect of the present invention, there is provided an imaging apparatus including: an acquisition unit which acquires image data including a subject; a filter unit which carries out average differential filtering for image data acquired by the acquisition unit; a storage unit which stores a feature quantity calculated from data obtained through average differential filtering for face image data of a subject of the same kind as the subject in advance; a face area detection unit which detects the face area of the subject from image data subjected to average differential filtering by the filter unit by using the feature quantity stored in the storage unit; a focusing unit which, when the face area of the subject is detected, carries out focusing control to be focused on the face area; and an image capturing unit which, when the face area of the subject is detected, captures an image focused on the face area as a still image; and wherein an aperture control unit is provided with the imaging apparatus, when the face area of the subject is detected by the face area detection unit, for increasing an aperture value during capturing the still image compared to when the face area of the subject is not detected.

According to still another aspect of the present invention, there is provided an imaging apparatus including: an acquisition unit which acquires image data including a subject; a filter unit which carries out average differential filtering for image data acquired by the acquisition unit; a storage unit which stores a feature quantity calculated from data obtained through average differential filtering for face image data of a subject of the same kind as the subject in advance; a face area detection unit which detects the face area of the subject from image data subjected to average differential filtering by the filter unit on the basis of the feature quantity stored in the storage unit; a focusing unit which, when the face area of the subject is detected, carries out focusing control to be focused on the face area; an image capturing unit which, when the face area of the subject is detected, captures an image with focused on the face area as a still image; a zoom unit which enlarges an image with optical zoom and digital zoom in accordance with a user's operation; and a selection unit selects whether or not to detect the face area of the subject by the face area detection unit in accordance with a user's operation; and wherein a zoom control means is provided with the imaging apparatus, when the selection means selects to detect the face area of the subject, for inhibiting image enlargement by optical zoom of the zoom unit and permitting only image enlargement by digital zoom.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a block diagram showing the hardware configuration of a digital camera 2;

DETAILED DESCRIPTION OF THE PREFERRED EMBODIMENTS

Hereinafter, a preferred embodiment of an imaging apparatus and an image capturing method according to the invention will be provided with reference to the accompanying drawings. In the following embodiment, an example will be described where the invention is applied to a digital camera and a subject is a dog or a cat.

Figure 1:
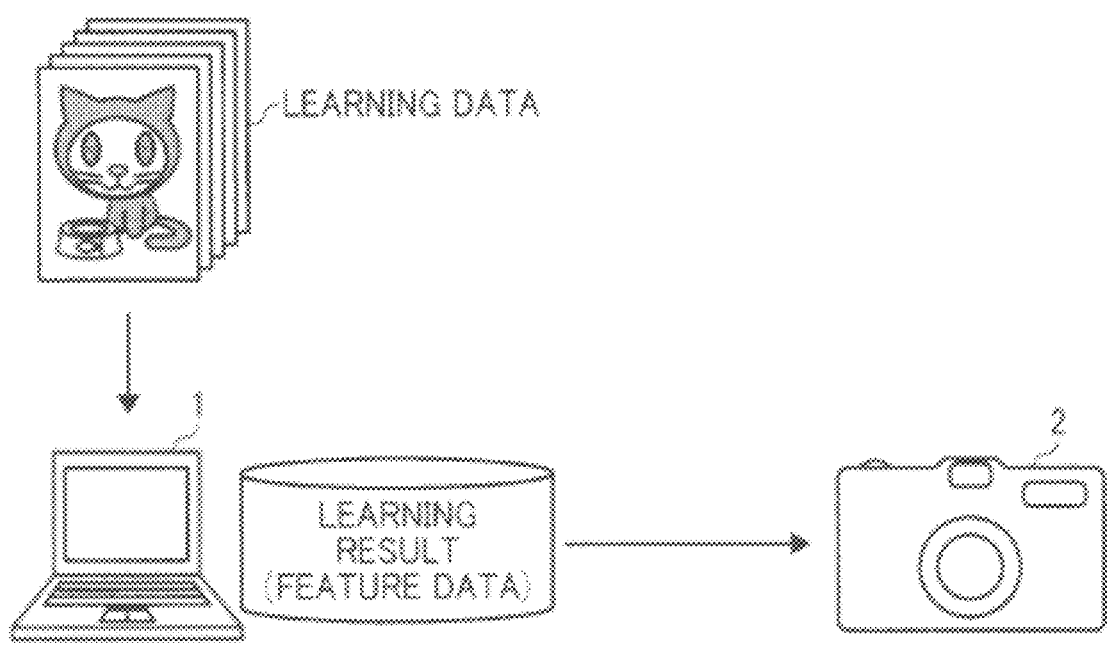
FIG. 1 is a schematic configuration diagram showing an overall configuration example in carrying out the invention.

First, a configuration will be described as the assumption in applying the invention to a digital camera. FIG. 1 is a schematic configuration diagram showing an overall configuration example in carrying out the invention. FIG. 1 shows an information processing apparatus 1 and a digital camera 2 as a hardware configuration.

Learning data is sample images of the face images (front face images) of multiple pets. The information processing apparatus 1 may be a personal computer (PC) or a server apparatus and is an apparatus which learns the face of a pet from learning data. Learning is done in advance, and the learning result (feature data) is stored in the digital camera 2, for example, at the time of factory shipment or the like of the digital camera 2. Thereafter, the digital camera 2 recognizes (detects) a front face photograph by using the learning result in practically photographing a pet and captures the front face photograph.

Figure 2A:
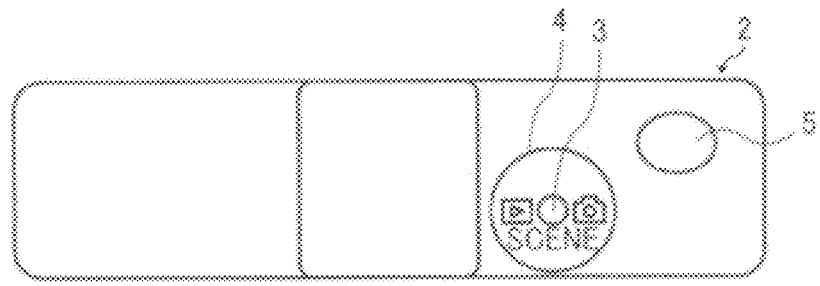
FIGS. 2A to 2C are schematic diagrams showing the appearance of a digital camera.
Figure 2B:
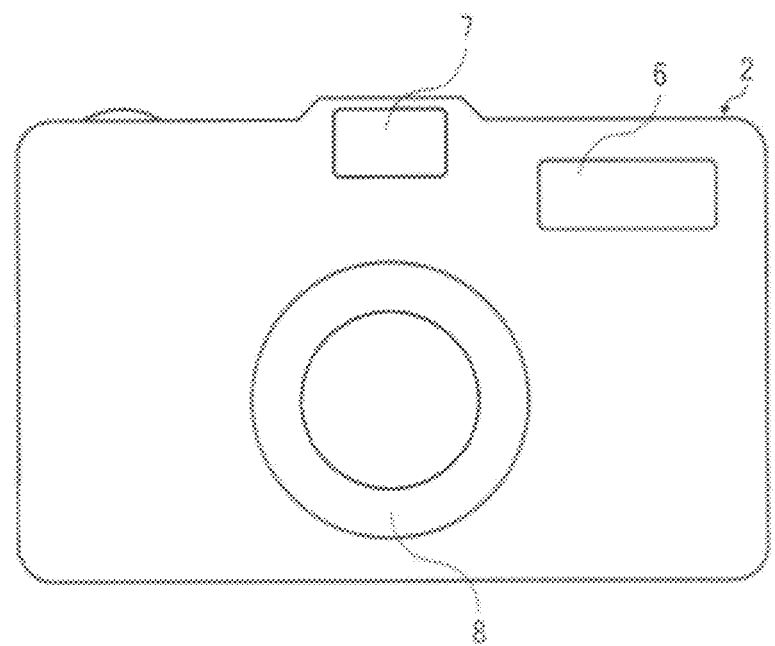
Figure 2C:
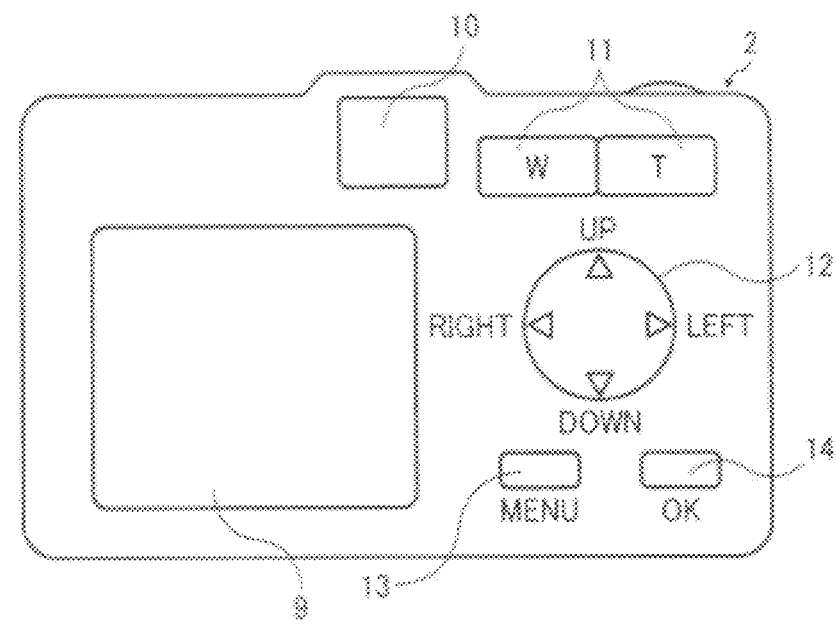

FIGS. 2A to 2C are schematic diagram showing the appearance of the digital camera 2 according to this embodiment. FIG. 2A is a top view of the digital camera 2. FIG. 2B is a front view of the digital camera 2. FIG. 2C is a rear view of the digital camera 2.

As shown in FIG. 2A, the digital camera 2 according to this embodiment has, in the upper surface, a power button 3 which is operated at the time of power on/off, a mode dial 4 which is operated in mode switching, and a release shutter button 5 which is pressed in capturing a still image. As shown in FIG. 2B, the digital camera 2 according to this embodiment has, in the front surface, a strobe light-emitting section 6 which emits strobe light, an optical finder (front) 7, a lens barrel unit 8 constituted by a zoom lens 16 or a focus lens 17 described below, an aperture unit 18, a mechanical shutter unit 19, and the like. As shown in FIG. 2C, the digital camera 2 of this embodiment has, in the rear surface, an LCD monitor 9, an optical finder (rear) 10, a zoom button 11 which is operated in performing enlargement or reduction an image by optical zoom and digital zoom, a select button 12 which is operated in case of performing selection of various instruction items, a menu button 13 which is operated in selecting a menu, and an OK button 14 which is operated in confirming a selected item. The LCD monitor 9 displays a monitoring image (for example, a monitoring image of a pet) serving as an electronic finder function.

FIG. 3 is a block diagram showing the hardware configuration of the digital camera 2 of this embodiment. The digital camera of this embodiment includes a CCD 20 serving as an image sensor, an analog front-end (AFE) 30 which processes an analog image signal output from the CCD 20 to generate digital image data, and a signal processing IC 40 which performs various kinds of digital image processing for digital image data output from the AFE 30 and controls the operation of the entire digital camera.

The CCD 20 receives incident light passing through the lens barrel unit 8, performs photoelectric conversion, and outputs the photoelectric conversion result as an electrical signal (analog image signal) corresponding to an optical image to AFE 30. The zoom lens 16 or the focus lens 17, the aperture unit 18, and the mechanical shutter unit 19 in the lens barrel unit 8 are driven by a motor driver 50. The motor driver 50 is controlled by a central processing unit (CPU) 45 in the signal processing IC 40.

The AFE 30 has a CDS 31 which samples and holds an analog image signal output (correlation double sampling) from the CCD 20, an auto gain control (AGC) 32 which adjusts the gain of a signal sampled by the CDS 31, an A/D converter (A/D) 33 which converts the output of the AGC 32 to a digital signal, and a timing signal generator (TG) 34 which outputs a drive timing signal to the CCD 20 and each section of the AFE 30. A digital signal (RGB image data) to be output from the AFE 30 is input to the signal processing IC 40.

The signal processing IC 40 has a memory controller 41, a CCD I/F section 42, an image processing section 43, a resize filter section 44, a CPU 45 which performs system control, a display I/F section 46, a JPEG codec section 47, a card controller section 48, and a communication I/F section 49. In addition to the above-described motor driver 50, to the signal processing IC 40 are connected a strobe module 51 which causes the strobe light-emitting section 6 to emit strobe light, various switches or buttons described above (hereinafter, an operating section 52) which are provided in the digital camera 2, a synchronous dynamic random access memory (SDRAM) 53 which temporarily stores image data, a ROM 54 which stores a program or control data, the above-described LCD monitor 9 or an image display (hereinafter, display device 55), such as a external TV from the digital camera 2, a memory card 56, a USB line 57, and the like.

The CCD I/F section 42 outputs a screen horizontal synchronization signal (HD) and a screen vertical synchronization signal (VD) to the TG 34 of the AFE and loads RGB image data to be input from the A/D converter 33 of the AFE 30 in accordance with the synchronization signals.

At the time of a monitoring operation to display an image based on image data on the display device 55, RGB image data loaded from the AFE 30 by the CCD I/F section 42 is converted to YUV data by the image processing section 43, converted to have a size suitable for display by the resize filter section 44, and output to a YUV data area 53b of the SDRAM 53.

The SDRAM 53 has a RAW-RGB data area 53a and a JPEG data area 53c, in addition to the YUV data area 53b. The YUV data area 53b stores YUV image data, the RAW-RGB data area 53a stores RAW-RGB image data from the AFE 30, and the JPEG data area 53c stores JPEG compressed image data.

At the time of still image capturing subsequent to the monitoring operation, transmission is done multiple times for all the pixels of the CCD 20. Thus, each piece of field data is stored in the RAW-RGB data area 53a of the SDRAM 53 through the memory controller 41 as needed.

The image processing section 43 converts RGB data sent from the CCD I/F section 42 or RGB data temporarily stored in the SDRAM 53 to YUV data on the basis of image processing parameters set from the CPU 45 which performs system control, and outputs YUV data.

The resize filter section 44 performs as input of YUV data and RGB data, size conversion to a size necessary for recording, size conversion to a thumbnail image, size conversion to a size suitable for display, or the like. The resize filter section 44 is capable of operating only a filter function without resizing by setting a resize magnification to one. With the regard to the setting of a filter, a high-pass filter may be set which extracts a component having a high spatial frequency (an edge component of an image) or a low pass filter may be set which extracts only a component having a low spatial frequency and carries out smoothing.

At the time of recording, the JPEG codec section 47 compresses YUV image data written in the YUV data area 53b of the SDRAM 53 and outputs JPEG encoded data. At the time of reproduction, the JPEG codec section 47 decompresses JPEG encoded data read from the memory card 56 to YUV image data and outputs YUV image data.

The card controller section 48 reads data in the memory card 56 to the SDRAM 53 and writes data on the SDRAM 53 in the memory card 56 in accordance with an instruction of the CPU 45.

The CPU 45 serving as an system control section loads a program and control data stored in the rewritable ROM 54 (including feature data as the learning result created by the information processing apparatus 1 in advance) in the SDRAM 53 at the time of actuation and performs overall control on the basis of the program code thereof. The CPU 45 performs photographing operation control, setting of image processing parameters in the image processing section 43, memory control, display control or the like in accordance with an instruction by a switch, a button, or the like of the operating section 52, an external operation instruction of a remote controller or the like (not shown), or a communication operation instruction from an external terminal, such as a personal computer.

The communication I/F section 49 performs transmitting and receiving image files by communication with a personal computer (PC), a printer, or the like through a line of the universal serial bus (USB) 57. Version upgrade of a control program which is executed by the CPU 45 can be realized by receiving a program from the PC through the line of the USB 57. The communication I/F section 49 may be connected to a line other than the line of the USB 57.

Figure 4:
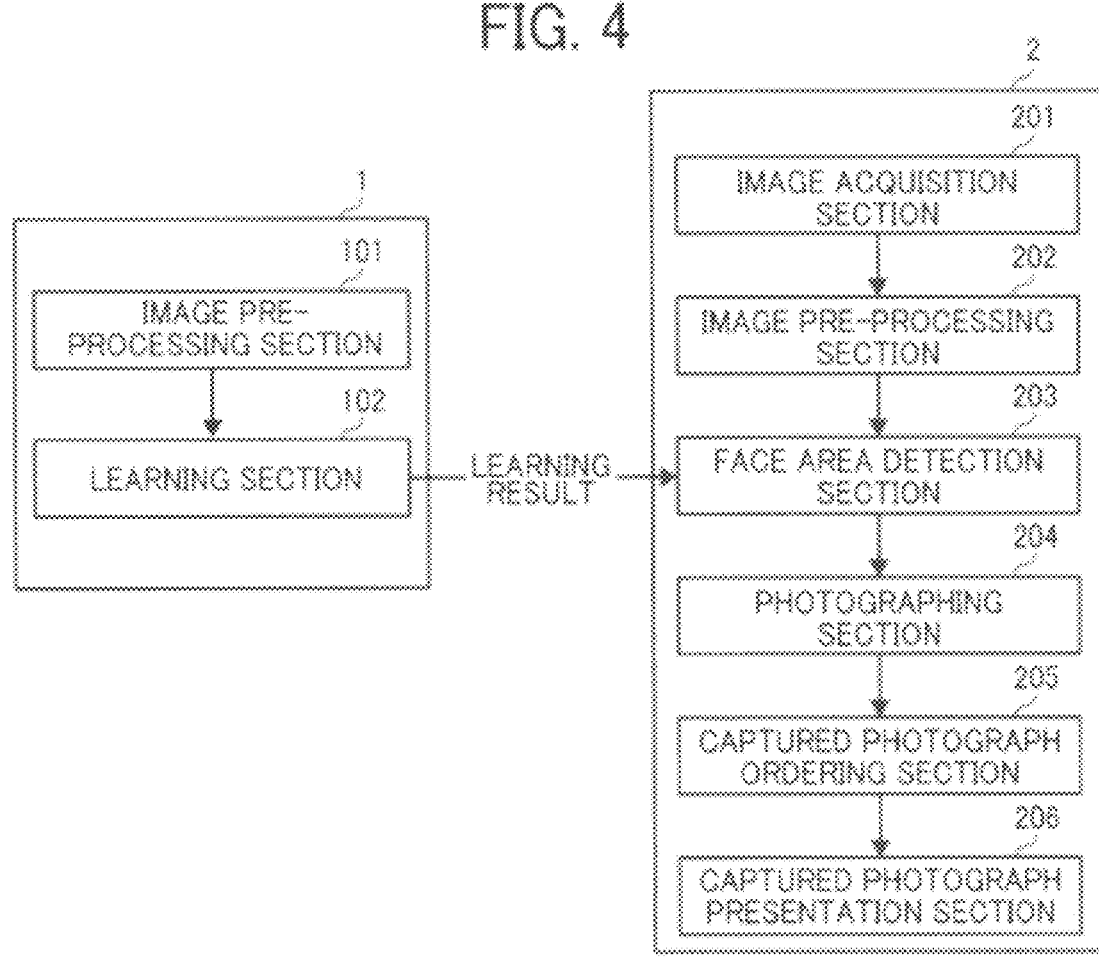
FIG. 4 is a functional block diagram showing the main functional configuration of an information processing apparatus and a digital camera.

FIG. 4 is a functional block diagram showing the main functional configuration of the information processing apparatus 1 and the digital camera 2 of this embodiment. The information processing apparatus 1 includes an image pre-processing section 101 and a learning section 102. The digital camera 2 includes an image acquisition section 201, an image pre-processing section 202, a face area detection section 203, a photographing section 204, a captured photograph ordering section 205, and a captured photograph presentation section 206. The details will be described in a processing operation, thus each functional section will be hereinafter described simply.

Figure 5:
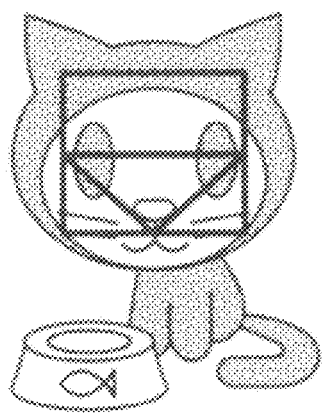
FIG. 5 is a diagram showing an example of learning data.

The image pre-processing section 101 of the information processing apparatus 1 carries out average differential filtering for input learning data as pre-processing of feature quantity learning (calculation) by the learning section 102. As described above, input learning data is sample images of the face images of multiple pets, and the face image of a pet is preferably a front face image. Specifically, an image is used which is obtained by cutting a rectangular area including both eyes and a nose (or mouth) of a pet (for example, see FIG. 5). This is because the face of a pet is detected on the basis of the feature quantities of both eyes and a nose (or mouth). The image pre-processing section 101 obtains a difference from the average luminance value of peripheral (adjacent) pixels, even when a pet is black, by performing average differential filtering for input learning data as pre-processing of feature quantity learning (calculation) by the learning section 102, such that both eyes and a nose (or mouth) is highlighted and output black (for example, see FIG. 6). The details will be again described below.

The learning section 102 learns (creates) the feature quantity (feature data) from learning data subjected to average differential filtering in the image pre-processing section 101. The feature quantity is used as feature data at the time of face detection processing of the digital camera 2. It can be said that the learning section 102 has a so-called learning phase function of obtaining data necessary for face detection, and the face area detection section 203 has a detection phase function of actually carrying out a detection operation. As a specific method of learning a feature quantity, a method described in Paul Viola and Michael J. Jones, "Rapid Object Detection using a Boosted Cascade of Simple Features," IEEE CVPR, 2001 is well known, and the Haar (Haar-like) feature quantity is also applicable to this embodiment. With regard to the Haar-like feature quantity, a difference of brightness between rectangular areas in an adjacent image is obtained by a rectangular filter and used as a feature quantity.

The image acquisition section 201 (acquisition unit) of the digital camera 2 acquires image data including a subject. Specifically, image data acquired by the image acquisition section 201 is RGB image data to be input from the AFE 30. Image data acquired by the image acquisition section 201 may be image data for monitoring to be output to the LCD monitor 9. In this case, image data is image data that is converted from RGB data to YUV data by the image processing section 43, converted to have a size suitable for display by the resize filter section 44, and output to the YUV data area 53b of the SDRAM 53.

The image pre-processing section 202 (filter unit) performs average differential filtering for image data acquired by the image acquisition section 201. In accordance that average differential filtering is carried out, even when a pet looks in image data and the color of the pet is black, a difference from the average luminance value of peripheral pixels is obtained, such that both eyes and a nose (or mouth) are highlighted and output black. That is, the processing in which the image pre-processing section 202 performs average differential filtering for image data is pre-processing for easily detecting the face area in the face area detection section 203. Image data acquired by the image acquisition section 201 is divided into a plurality of rectangular blocks in the image pre-processing section 202 and average differential filtering is carried out for the respective rectangular blocks. This will be again described below.

The face area detection section 203 detects the face area of a subject (for example, a pet) from image data subjected to average differential filtering. As described above, face detection method is done by a pattern matching technique using the feature quantities learned by the learning section 102 of the information processing apparatus 1. In the detection processing, an image is divided to be of an arbitrary size (corresponding to the above-described rectangular size), called a detection window, and a feature pattern is sequentially applied to the detection window to calculate the feature quantity. Since the size of the face area is not known, feature quantity calculation is done with various sizes such that face areas of different sizes can be detected. With regard to a specific method of detecting a face area, a method is used which is described in Paul Viola and Michael J. Jones, "Rapid Object Detection using a Boosted Cascade of Simple Features," IEEE CVPR, 2001.

When the face area of a subject (for example, a pet) is detected by the face area detection section 203, the photographing section 204 performs automatic control to adjust focus, exposure, white balance, and the like for the face area (focusing unit) and captures a subject image as a still image (image capturing unit). The digital camera 2 of the embodiment has a consecutive photographing mode and can continuously capture a plurality of photographs (still images) as well as a single photograph.

When a plurality of photographs (still images) are captured in the consecutive photographing mode, the captured photograph ordering section 205 performs the ordering of the captured photographs in a presentation sequence. Specifically, ordering is done from a photograph in which a subject is well captured toward the front. When a plurality of photographs are not captured in the consecutive photographing mode, a single photograph is to be captured, thus the relevant functional section is not used.

When a plurality of photographs are captured in the consecutive photographing mode, the captured photograph presentation section 206 presents the user with a plurality of photographs in the sequential order set by the captured photograph ordering section 205 through display on the LCD monitor 9, or the like. When a plurality of photographs are not captured in the consecutive photographing mode, a single photograph is to be captured, thus the captured photograph presentation section 206 presents the single captured photograph.

The above-described functional section of the digital camera 2 is practically realized when the CPU 45 in the signal processing IC 40 executes the program stored in the ROM 54.

Figure 7:
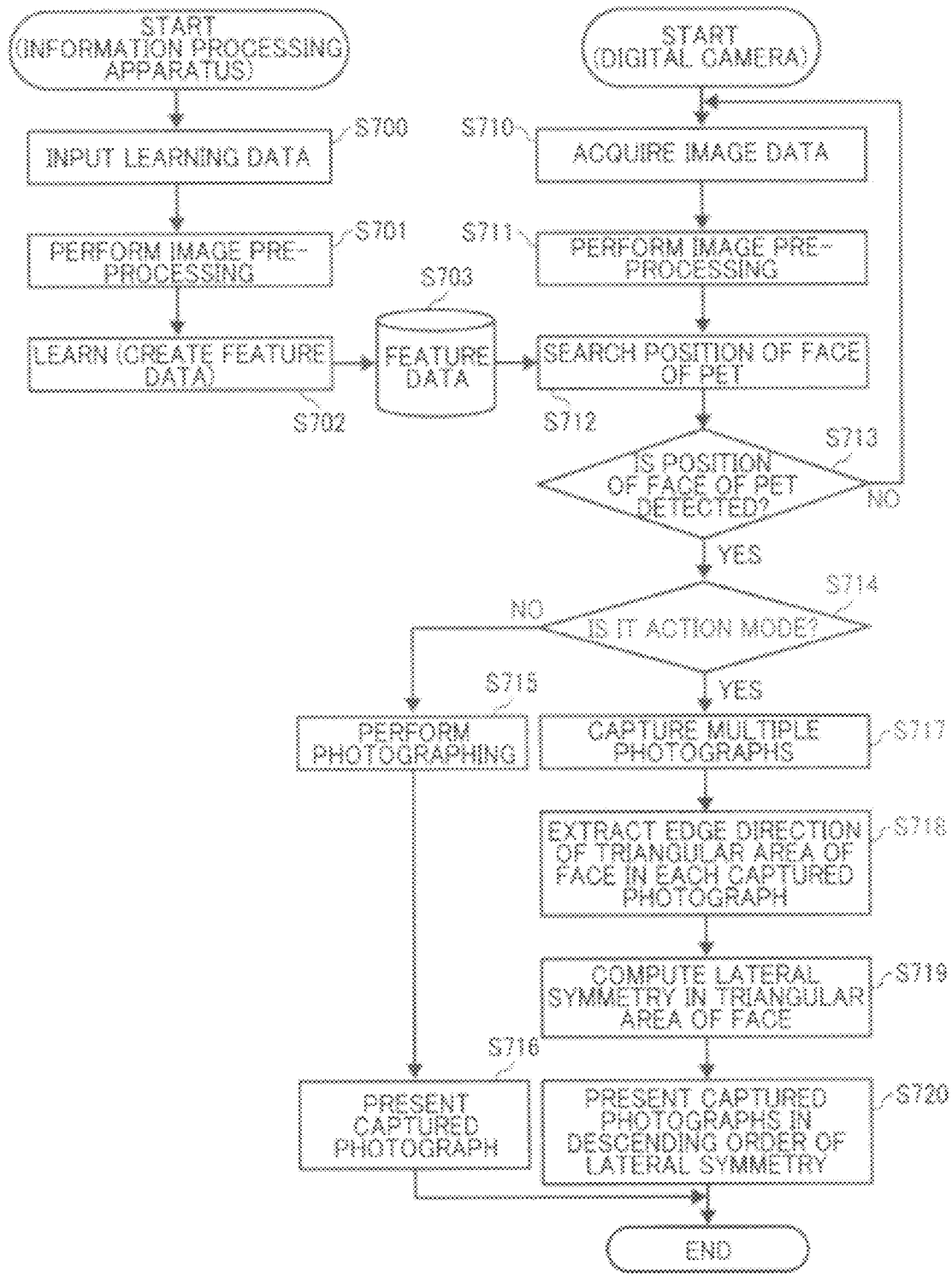
FIG. 7 is a flowchart illustrating the operation of an information processing apparatus and a digital camera.

FIG. 7 is a flowchart illustrating the operation of the information processing apparatus 1 and the digital camera 2. Hereinafter, the processing operation will be described with reference to a flowchart of FIG. 7 in association with the above-described functional sections.

First, as described above, the information processing apparatus 1 carries out an operation for creating feature data for use in face detection processing from learning data (sample image) in advance. The information processing apparatus 1 inputs the face image of a pet (for example, a rectangular area including both eyes and a nose (or mouth) (S700) as the learning data.

Figure 6:
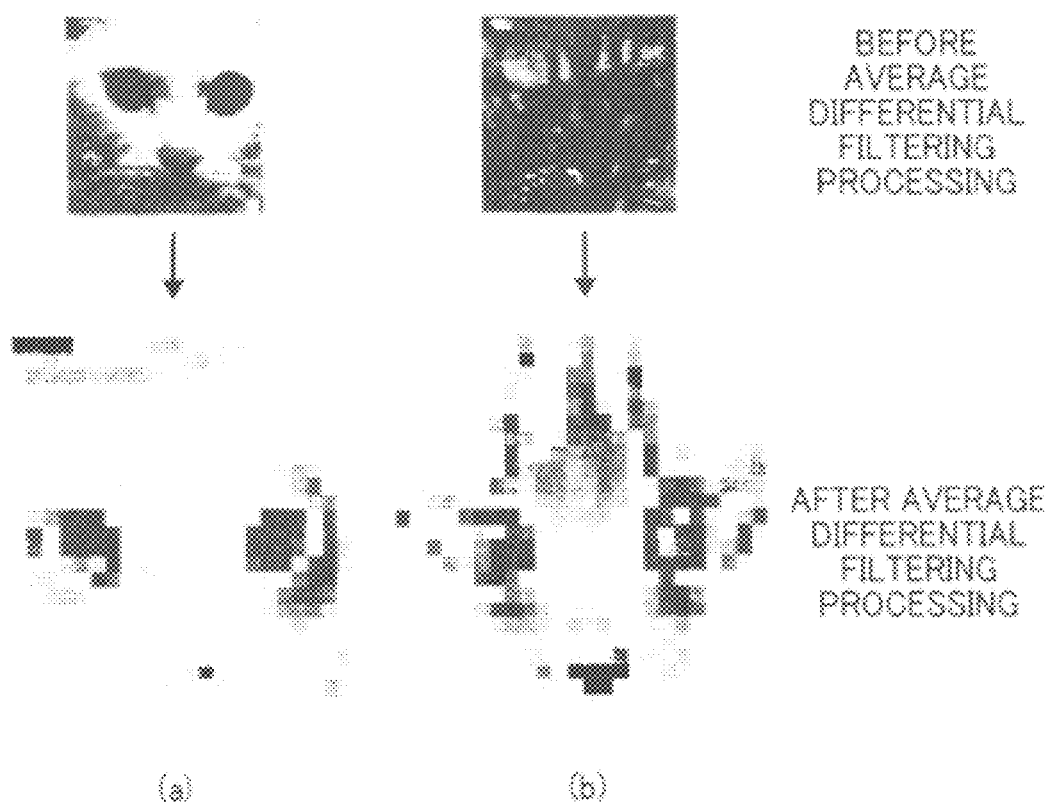
FIG. 6 is a diagram showing an example of an image subjected to average differential filtering.

For the information processing apparatus 1, the image pre-processing section 101 carries out average differential filtering for input learning data as pre-processing of feature quantity learning (calculation) (S701). This is because, if average differential filtering is carried out for input learning data, even when a pet is black, a difference from the average luminance value of peripheral (adjacent) pixels is obtained, such that both eyes and a nose (or mouth) are highlighted and output as black. FIG. 6 will be again referenced. FIG. 6(a) shows an example of a white cat, and FIG. 6(b) shows an example of a brown cat. Before the average differential filtering processing, the cat has different fur colors, but after the average differential filtering processing, particularly in FIG. 6(b), an image is obtained in which both eyes and the nose (or mouth) of the brownish cat in particular of FIG. 6(b) are highlighted. As described above, even the same cat has various fur colors, so it is very difficult to specify both eyes and the nose (or mouth) in face area detection. However, it becomes possible to facilitate the specification through the average differential filtering processing.

The average differential filtering processing can be performed by calculating the following expression, $$|\text{Average luminance value} - \text{Luminance value of pixel for attention}|$$

that is, the absolute value of the difference between an average luminance value and the luminance value of a pixel for attention for the pixels in image data.

The average luminance value is the average value of luminance of pixels adjacent to the pixel for attention (certain one pixel). Adjacent pixels may be, for example, directly adjacent 3×3 pixel blocks, or may be 5×5 pixel blocks from the viewpoint of reduction in processing burden. In order to easily calculate the average luminance value, an integral image may be previously created. The integral image is created by cumulatively calculating the sum of the luminance values of the respective pixel blocks. For this reason, for example, in calculating the average luminance value of the 3×3 pixel blocks, the luminance value (cumulative sum) of the upper left pixel block is subtracted from the luminance value (cumulative sum) of the lower right pixel block in the 3×3 pixels and the resultant value is divided by 9. In this way, the average luminance value of the 3×3 pixel blocks can be computed at high speed.

The learning section 102 learns the feature quantity from learning data subjected to differential filtering (S702). The feature quantity is created as feature data and is used in the face area detection processing of the digital camera 2. Thus, feature data created by the learning section 102 of the information processing apparatus 1 is written and stored in the ROM 54 of the digital camera 2 or the like, for example, at the time of factory shipment or the like of the digital camera 2 (S703).

Next, description will be provided a flow when the user practically photographs a pet by the digital camera 2. If the power button 3 is operated to power on the digital camera 2 by the user, selects a scene mode (SCENE) by the mode dial 4, and the menu button 13 is depressed, a list of a plurality of settable scene modes including the pet recognition mode is displayed on the LCD monitor 9. Then, if the select button 12 is operated to select the pet recognition mode from among a plurality of scene modes by the user and the OK button 14 is depressed, the operation of the digital camera 2 in the pet recognition mode starts.

If the lens is turned toward the pet in a state by the user where the digital camera 2 is operating in the pet recognition mode, the monitoring operation starts and the monitoring image of a pet is displayed on the LCD monitor 9. At this time, the image acquisition section 201 acquires RGB image data to be input from the AFE 30 or YUV image data for monitoring (S710). It is assumed that at least the entire portion or a portion of the pet falls within and is displayed on the LCD monitor 9.

Figure 8:
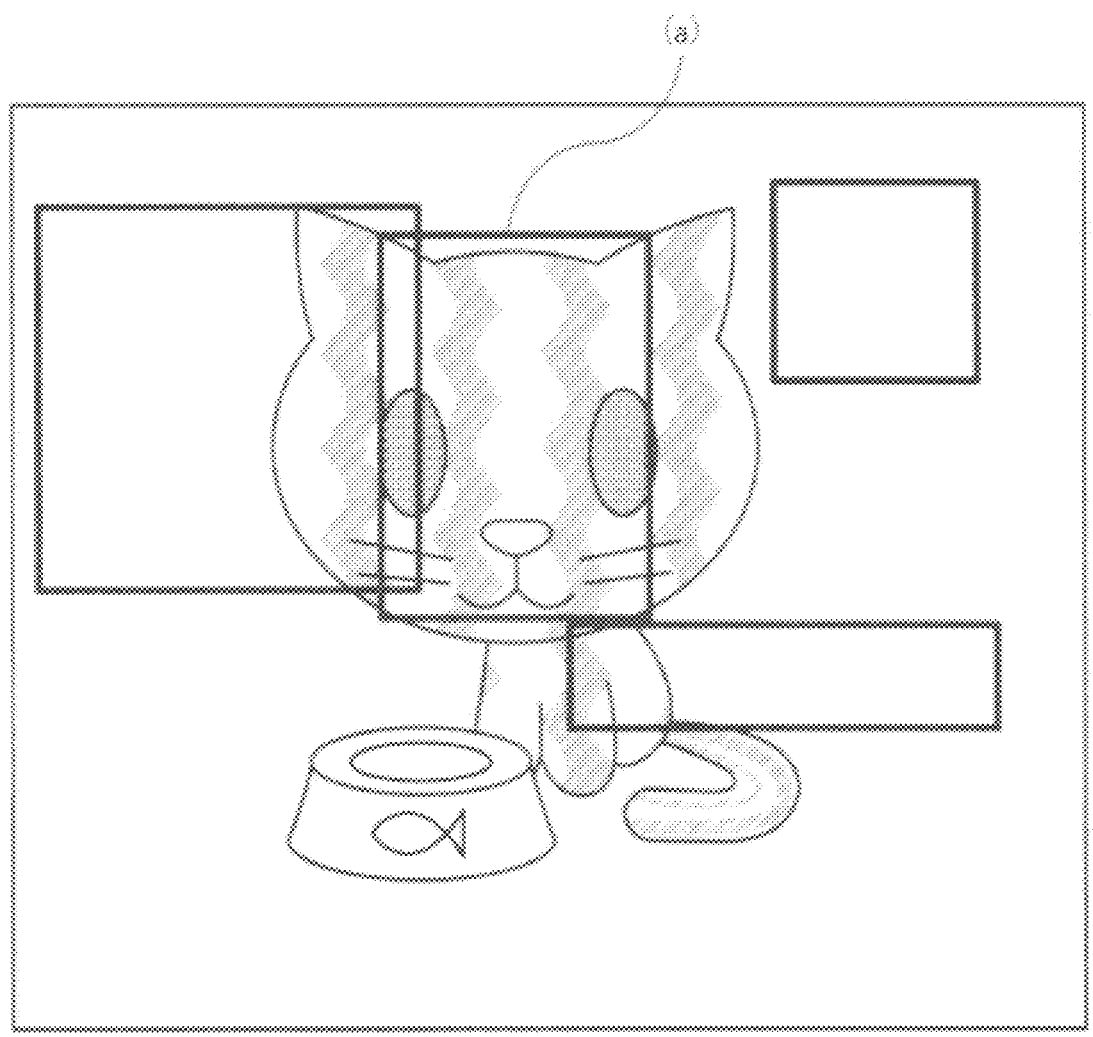
FIG. 8 is a diagram showing a condition in which image data is subjected to average differential filtering with a plurality of rectangular sizes.

For the digital camera 2, next, the image pre-processing section 202 performs the above-described average differential filtering for acquired image data (S711). The average differential filtering processing is the same as the above-described processing in the image pre-processing section 101, thus description thereof will be omitted. In performing average differential filtering for acquired image data, the image pre-processing section 202 sets an area (object average area) for acquiring the average luminance value of plurality of rectangular sizes and performs average differential filtering. The rectangular size include, for example, the above-described 3×3 pixel blocks, 5×5 pixel blocks, or slightly greater 10×10 blocks, 20×20 blocks, or the like. This is because the face area of the pet is of great size and small size, thus it is necessary to detect face areas of different sizes. The shape of the rectangle is not limited to a square. For example, a vertically long rectangle or a horizontally long rectangle may be used. In order to associate with the stripe pattern of the pet, if a vertically long rectangle is used, it is possible to increase the face area detection accuracy of the pet having a vertical stripe pattern, and if a horizontally long rectangle is used, it is possible to increase the face area detection accuracy of the pet having a horizontal stripe pattern. In this case, the rectangular size is, for example, 10×20 blocks (horizontally long rectangle), 20×10 blocks (vertically long rectangle), or the like. FIG. 8 is a diagram showing a condition in which image data is subjected to average differential filtering with a plurality of rectangular sizes. Although in FIG. 8, a plurality of rectangular sizes is shown simultaneously, an object average area is set for each rectangular size and average differential filtering is carried out. Referring to FIG. 8, it is anticipated that a face area is most likely to be detected from an image subjected to average differential filtering by a vertically long rectangle (a).

Next, the face area detection section 203 tries to detect the face area of the pet on the basis of feature data from image data subjected to differential filtering (S712). This is to search whether or not the face (front) of the pet is in an image. With regard to the face detection method, as described above, a method is used in which pattern matching is sequentially carried out for the rectangle (detection window) by using the learned feature quantity.

When it is determined that the face area of the pet is not detected (S713: No), it is impossible to acquire an image in which the pet turns toward the front. Thus, image data is discarded and new image data is acquired by the image acquisition section 201 (S710). In this way, the trial to detect the face area of the pet is repeated several times (S710 to S713). When the face area of the pet is not detected after a predetermined time has elapsed, the indication is notified to the user.

If the pet turns toward the front (toward the lens) at a certain timing and the face area of the pet is detected (S713: Yes), the photographing section 204 decides whether or not the consecutive photographing mode is set before photographing (S714). When the consecutive photographing mode is not set (S714: No), the photographing section 204 performs automatic control for the detected face area of the pet to adjust focus, exposure, white balance, and the like and captures the subject image as one still image (S715). The captured photograph presentation section 206 presents the captured photograph to the user, for example, through the LCD monitor 9 (S716).

On the other hand, when the consecutive photographing mode is set (S714: Yes), the photographing section 204 performs automatic control for the detected face area of the pet to adjust focus and the like and continuously captures the subject image as a plurality of still images (S717).

Figure 9A:
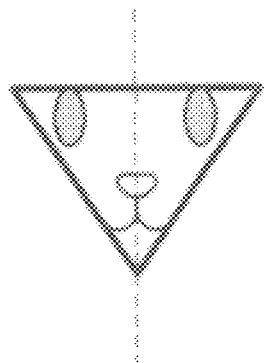
FIGS. 9A and 9B are diagrams showing lateral symmetry of a triangular area.
Figure 9B:
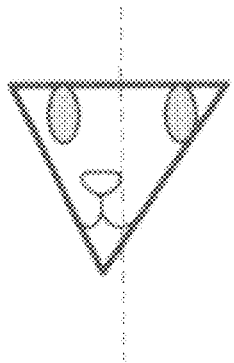

The captured photograph ordering section 205 performs the ordering of a plurality of captured photographs continuously captured in the consecutive photographing mode to be presented to the user. That is, the captured photograph ordering section 205 first extracts the edge direction of a triangular area of the face from the detected face area for each captured photograph (S718), and determines (computes) lateral symmetry in the edge direction (S719). It is assumed that the triangular area of the face is an area which is formed by connecting three points of a left eye, a right eye, and a nose (or mouth). With regard to a captured photograph with the highest degree of symmetry, it is highly likely that the pet turns toward the front. For this reason, the captured photograph ordering section 205 performs the ordering of a plurality of captured photographs in the consecutive photographing mode in descending order of symmetry (degree of symmetry). FIGS. 9A and 9B are diagrams illustrating lateral symmetry of a triangular area. In FIG. 9A, it is determined that lateral symmetry is high in the edge direction of the triangular area, and in FIG. 9B, it is determined that lateral symmetry is low in the edge direction of the triangular area.

The captured photograph presentation section 206 presents the captured photographs to the user, for example, through the LCD monitor 9 in descending order of lateral symmetry according to the ordering (S720). Thus, it is possible to arrange the captured photographs in order from a photograph in which a satisfactory photographing result is obtained and to present the captured photographs to the user.

As described above, in the digital camera 2 of this embodiment, in detecting the face area of a pet serving as a subject from an image, average differential filtering is carried out for acquire image data to detect the face area. An animal, such as a dog or a cat, has a face in various colors. For this reason, even when the face area of an animal is detected by an imaging apparatus of the related art which is capable of detecting the face area of a person, there is an affect of color or pattern in face area recognition, making it difficult to appropriately recognize the face area of the animal from an image. In contrast, according to the digital camera 2 of this embodiment, in detecting the face area of an animal (pet), such as a dog or a cat, having a face in various colors, the face area is detected from image data subjected to average differential filtering. Thus, there is no affect of color or pattern, making it possible to appropriately recognize the face area of the animal from an image.

In addition to a case where the face of an animal has various colors, a special case is assumed in which the face has a stripe pattern. The stripe pattern may cause a decrease in face area detection accuracy. For this reason, in the digital camera 2 of this embodiment, a method is used in which an object image is divided into vertically long rectangles or horizontally long rectangles, and pattern matching with the rectangle (detection window) is carried out by using the learned feature quantity, increasing face area detection accuracy of the animal. When a plurality of photographs are captured in the consecutive photographing mode, the photographs can be presented in order of possibility from a photograph in which the animal is highly likely to turn toward the front, confirming the captured photographs in order from a photograph in which a satisfactory photographing result is obtained.

In the digital camera 2 of this embodiment, a technique has been described in which the face area of a pet can be accurately recognized to capture the photograph of the front face of the pet. Next, an optimum photographing operation in the pet recognition mode will be described. As described above, in photographing a strenuously moving pet as a still image, even when the pet is moving, it is desirable to carry out photographing with the setting in which the digital camera is accurately focused on the face position of the pet. In the digital camera 2 of this embodiment, the setting suitable for photographing the pet is automatically carried out, making it possible to avoid complexity because the user manually sets the fine photographing conditions and to appropriately capture the image of the pet with a simple operation.

First, the outline of the basic operation of the digital camera 2 of this embodiment will be described. The operation mode of the digital camera 2 includes a photographing mode which is used in photographing and a reproduction mode which is used in reproducing a captured image. During the operation in the photographing mode, an operation mode, such as a self timer mode in which photographing is carried out using a self timer or a remote control mode in which the digital camera 2 is remote-operated by a remote control device, is further prepared. If the mode dial 4 is set to the photographing mode in a state where the power button 3 of the digital camera 2 is turned on, the digital camera 2 is in the photographing mode.

When the mode dial 4 is set to the reproduction mode, the digital camera 2 is in the reproduction mode.

Figure 10:
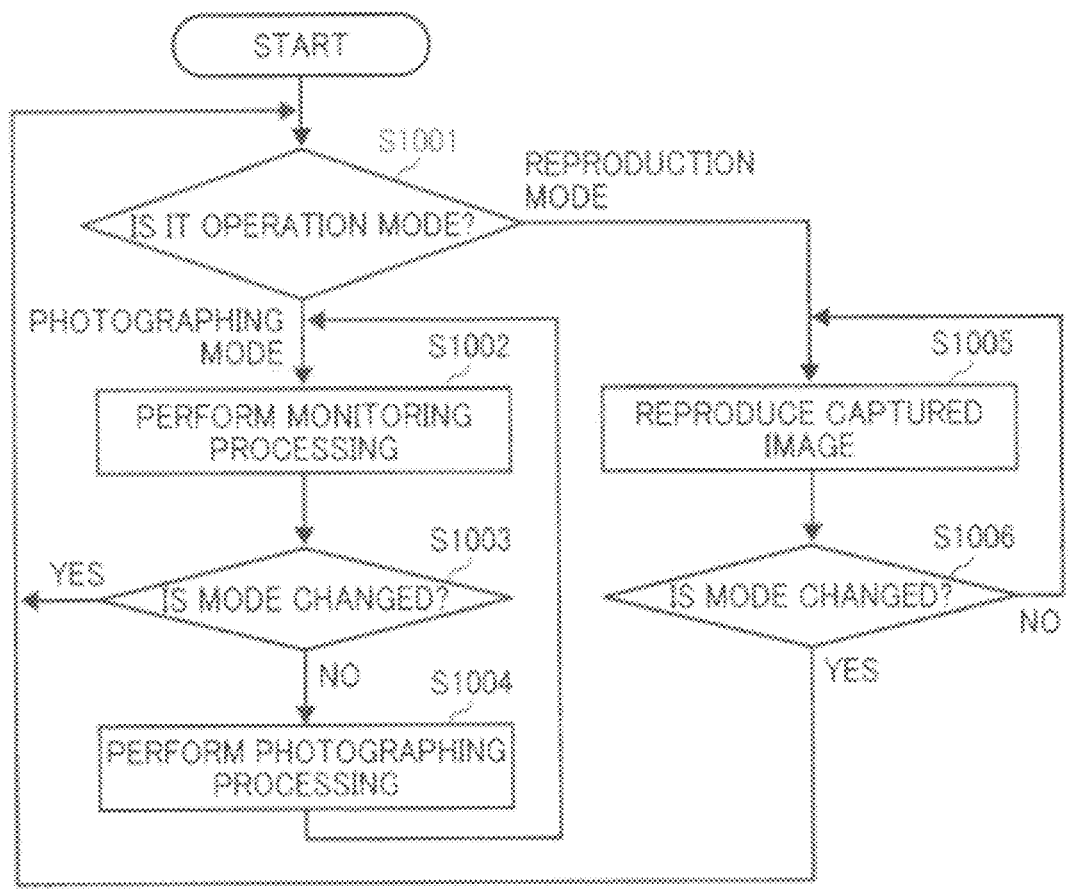
FIG. 10 is a flowchart showing the outline of the basic operation of a digital camera.

If the power button 3 of the digital camera 2 is turned on, processing of a flowchart of FIG. 10 starts. Hereinafter, a flow of general processing of the digital camera 2 will be described with reference to FIG. 10. The processing shown in FIG. 10 is executed by the CPU 45 in the signal processing IC 40.

First, in Step S1001, it is determined whether the switch state of the mode dial 4 is the photographing mode or the reproduction mode, and if it is determined to be the photographing mode, the process progresses to Step S1002. If it is determined to be the reproduction mode, the process progresses to Step S1005.

In Step S1002, the motor driver 50 is controlled by the CPU 45 in the signal processing IC 40, such that the lens-barrel (the zoom lens 16 and the focus lens 17) constituting the lens barrel unit 8 is moved to a position where photographing is possible. Power is supplied to the respective circuits necessary for photographing, such as the CCD 20, the AFE 30, the LCD monitor 9, and the like.

Information of a subject image which is formed in the light-receiving portion of the CCD 20 by the zoom lens 16 and the focus lens 17 is converted to an RGB analog signal by the CCD 20 as needed. The RGB analog signal is subjected to predetermined processing, such as noise reduction processing or gain adjustment processing, by the CDS 31 and the AGC 32 in the AFE 30. The RGB analog signal is converted to an RGB digital signal by the A/D converter 33, and the RGB digital signal is output to the CCD I/F section 42 of the signal processing IC 40.

The RGB digital signal is appropriately converted to RAW-RGB image data, YUV image data, and JPEG image data in the signal processing IC 40, and RAW-RGB image data, YUV image data, and JPEG image data are written in the frame memory (the RAW-RGB data area 53a, YUV data area 53b, and the JPEG data area 53c) of the SDRAM 53 by the memory controller 41.

Of image data, YUV image data is read from the frame memory of the SDRAM 53 as needed and converted to a video signal by the display I/F section 46. The video signal is output to the LCD monitor 9 or the display device 55, such as a TV.

As described above, the processing for, in a photographing standby state, in connection with loading image data of the subject image in the frame memory of the SDRAM 53 as needed, outputting the subject image to the LCD monitor 9 or the display device 55, such as a TV, as needed is referred as monitoring processing (monitoring operation).

In Step S1003, it is determined whether or not the setting of the mode dial 4 is changed. If the setting is changed, the process progresses to Step S1001. If the setting is not changed, the process progresses to Step S1004.

In Step S1004, the state of the release shutter button is determined. When the release shutter button 5 is not depressed, the process returns to Step S1002. When the release shutter button 5 is depressed, processing is performed for recording image data of the subject, which is loaded in the frame memory of the SDRAM 53 at this time, in an internal memory or the memory card 56. Thereafter, the process progresses to Step S1002. Step S1004 is referred as photographing processing.

As described above, when the digital camera 2 is operating in the photographing mode, Steps S1002 to S1004 are repeated. The state where repetitive processing is performed is referred as a finder mode. In the digital camera 2 of this embodiment, the processing is repeated in a cycle of about 1/30 seconds.

In the finder mode, the monitoring processing is also repeated in a cycle of about 1/30 seconds. Thus, display of the LCD monitor 9 or the display device 55, such as a TV, is updated.

In Step S1005, image data recorded in the internal memory or the memory card 56 is output to the LCD monitor 9 or the display device 55, such as a TV, and the process progresses to Step S1006.

In Step S1006, it is determined whether or not the setting of the mode dial 4 is changed. If the setting is changed, the process returns to Step S1001. If the setting is not changed, the process returns to Step S1005.

Next, as the main function of the digital camera 2 of an example of this embodiment, an AE function, an AF function, and a pet focus function using a pet recognition function will be described.

In general, the auto exposure (AE) function refers to a function (automatic exposure function) of changing a combination of the aperture value and the shutter speed in an imaging apparatus, such as a camera, to automatically decide the exposure amount of the light-receiving portion of the imaging element. The auto focus (AF) function refers to a function (automatic focus function) of automatically focusing the imaging lens.

The pet recognition function refers as a function of outputting area information of a face area corresponding to a face portion when the face image of a pet is detected from the entire image area of an image of a subject loaded from the imaging element.

In the digital camera 2 of this embodiment, as described above, when the pet recognition mode is selected by a user's operation, the pet recognition function is carried out by comparing image data subjected to average differential filtering with feature quantity data previously stored to output area information of the face area of the pet. The pet focus function refers as a function of performing AE processing or AF processing for a face area recognized by the pet recognition function when a pet is included in a subject to adjust exposure or focus on the face of the pet. It functions in the pet recognition mode.

In the digital camera 2 of this embodiment, the pet recognition mode is set when, as described above, the scene mode (SCENE) is selected by the mode dial 4, the menu button 13 is depressed, the pet recognition mode is selected from among a list of a plurality of scene modes displayed on the LCD monitor 9 by the select button 12, and the OK button 14 is depressed. In the digital camera 2 of this embodiment, when the pet recognition mode is selected, in the finder mode, pet recognition is carried out as needed.

Figure 11:
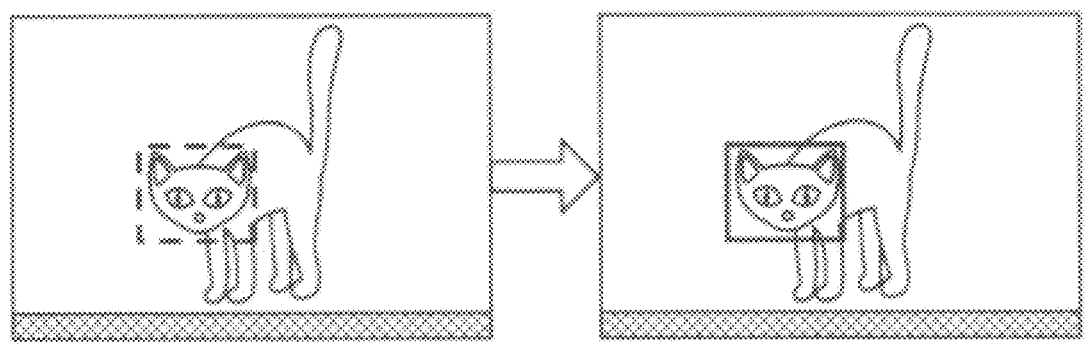
FIG. 11 is a diagram illustrating an AF area when a digital camera operates in a pet recognition mode.

When the digital camera 2 is operating in the pet recognition mode, for example, as shown in FIG. 11, an image area around the face of a pet included in a subject is set as an area of object (hereinafter, this area is referred to as a face area). Luminance data of the face area is used in the AE processing or the AF processing.

The AF function of the digital camera 2 of this embodiment will be further described in detail. As the method of AF control which may be used in the digital camera 2 of this embodiment, hill-climbing AF control method is known. During a focusing detection operation in the hill-climbing AF control method, while the focus lens 17 is driven by the motor driver 50 to move in the optical axis direction of the lens barrel unit 8, an AF evaluation value (contrast) at each moving position of the focus lens 17 is calculated, and the position of the focus lens 17 where the maximum AF evaluation value is obtained (the position having the maximum AF evaluation value) is detected by the signal processing IC 40. When the image loaded by the CCD 20 is in a focusing state, a profile portion of the image of the subject is clear. Thus, the AF evaluation value in the profile portion of the image increases. A case in which there are a plurality of positions with the maximum AF evaluation value are taken into consideration. When there are a plurality of positions, the magnitude of AF evaluation value at the maximum or the degree of lowering or rising with evaluation values of the peripheral is determined, and the AF processing is performed with a position with highest reliability as a focusing position.

Data of the AF evaluation value is stored as feature data of the image in the memory of the signal processing IC 40 as needed, and feature data is used in the AF processing. The AF evaluation value can be calculated in a specific range of the loaded image on the basis of the digital RGB signal.

Figure 12:
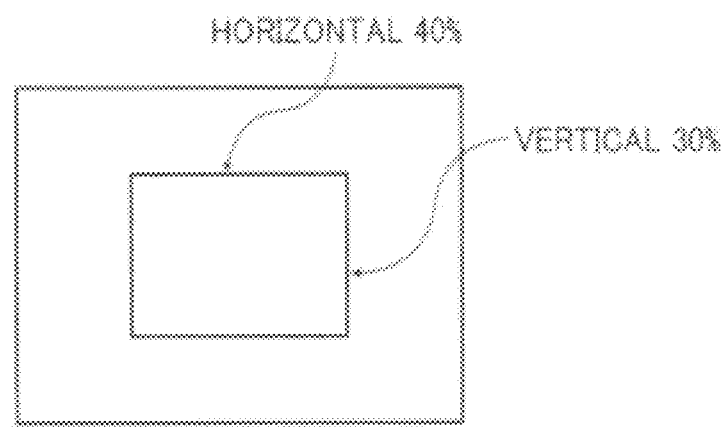
FIG. 12 is a diagram illustrating an AF area in a normal photographing mode.

FIG. 12 shows the display state of the LCD monitor 9 in the finder mode. A central frame of an LCD display area shown in FIG. 12 is a normal AF area (hereinafter, referred to as "normal AF area") in the digital camera 2. In the digital camera 2 of this embodiment, a portion of 40% in the horizontal direction and 30% in the vertical direction of the LCD display area shown in FIG. 12 is set as the normal AF area.

When the digital camera 2 is operating in the pet recognition mode and the face of the pet in the subject can be recognized, as shown in FIG. 11, the AF area is set to the recognized face area of the pet.

In the digital camera 2 of this embodiment, if the release shutter button 5 is depressed halfway, an AF evaluation value representing the exposure state and an AF evaluation value representing the degree of focusing of the screen are calculated on the basis of the RGB digital signal loaded by the CCD I/F section 42 of the signal processing IC 40.

Example 1

Next, as Example 1, an example will be described where, in the digital camera 2 of an example of this embodiment, as the setting for appropriately photographing a pet, when the face area of the pet is detected, increasing the shutter speed during the AF control and still image capturing compared to a case where the face area of the pet is not detected.

In photographing a pet in the pet recognition mode, unlike photographing of a person, the pet serving as a subject is very likely to move around without being stationary in the same pose. Thus, in capturing the image of the pet as a still image, in many cases, the image may be jittered. Thus, in Example 1, in order to accurately focus on a moving subject and to carry out photographing without jittering, processing is performed for increasing the shutter speed only when the pet is recognized (shutter speed control unit). Control of the shutter speed is executed by the CPU 45 in the signal processing IC 40.

The shutter speed refers to the time for determining the amount of light which hits against the CCD 20 serving as a photosensitive member (image sensor). The unit of the shutter speed is second, and in a general digital camera, the shutter speed has a width of about 1/2000 to 1 second. In order to obtain appropriate exposure, a given light amount is required. Usually, when a subject is bright, the shutter speed is set to high speed, and when a subject is dark, the shutter speed is set to low speed. However, the shutter speed is not determined only by the brightness of the subject. The determining factors for exposure include aperture and ISO sensitivity, as well as the shutter speed. An appropriate shutter speed changes depending on the setting of the two factors. The slower the shutter speed, the more subject jittering or shaking occurs.

Figure 13:
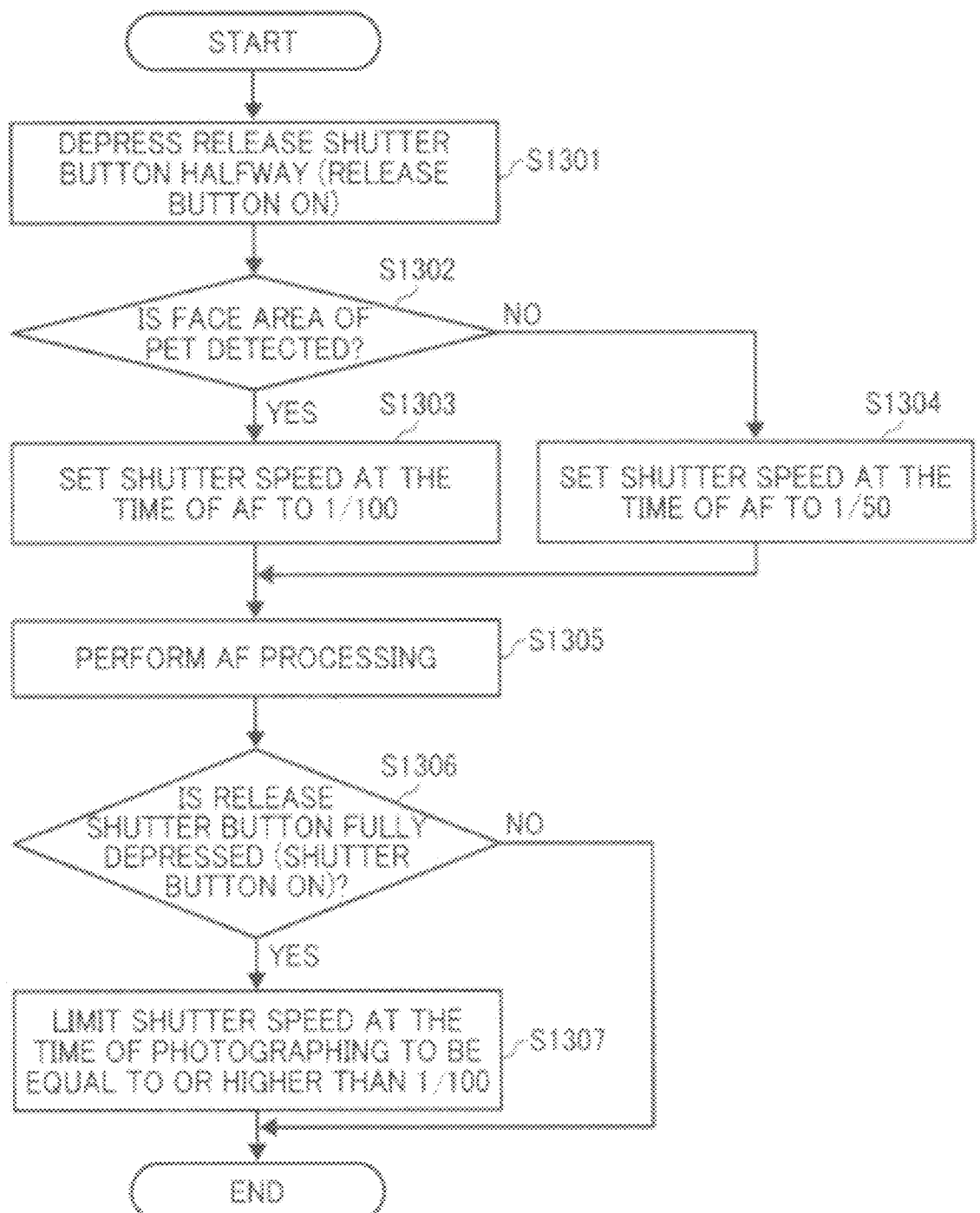
FIG. 13 is a flowchart showing a flow of specific processing in Example 1.

A flow of specific processing in Example 1 will be described with reference to a flowchart of FIG. 13. First, the pet recognition mode is selected by a user's operation and the digital camera 2 operates in the pet recognition mode. Thus, pet recognition starts. Thereafter, in Step S1301, the release shutter button 5 is depressed halfway (release button ON), such that the AF operation starts. At this time, it is determined whether or not the face area of a pet is detected by the pet recognition function (S1302).

When the face area of the pet is not detected (S1302: No), the shutter speed during the AF operation is set to the normal shutter speed for AF (S1304). The shutter speed for AF can be set to an optimum value for obtaining exposure appropriate for AF control. In this example, the AF shutter speed is set to 1/50. On the other hand, when the face area of the pet is detected (S1302: Yes), the shutter speed during the AF operation is set to be higher than the normal AF shutter speed (Step S1303). That is, under the limitation on a selectable value as the shutter speed for AF control, the shutter speed is set to be higher than the normal shutter speed for AF control (in this example, 1/100). At this time, in order to maintain appropriate exposure, the ISO sensitivity and the aperture are automatically changed in accordance with the shutter speed.

The AF operation is carried out at the set shutter speed (S1305), and when the release shutter button 5 is full depressed (shutter button ON) (S1306: Yes), a photographing operation is carried out to capture the image of the pet as a still image. During the photographing operation, when the face area of the pet is detected, the shutter speed is increased (S1307). Specifically, the shutter speed has a predetermined limit value (in this example, equal to or higher 1/100), and photographing is not carried out at equal to or lower than a given shutter speed.

The digital camera 2 of this embodiment performs the above-described processing in photographing a pet in the pet recognition mode, carrying out robust AF for a moving subject and photographing. Thus, it is possible to eliminate a problem in that the evaluation value cannot be accurately acquired because a subject is moving during AF evaluation value acquisition or a problem in that subject blurring occurs because a subject is moving at the time of photographing.

Example 2

Next, as Example 2, an example will be described where, in the digital camera 2 of an example of this embodiment, as the setting for appropriately photographing a pet, when the face area of the pet is detected, increasing the aperture value during still image capturing compared to a case where the face area of the pet is not detected.

As described above, in photographing a pet, unlike photographing of a person, the pet serving as a subject is very likely to move around without being stationary in the same pose. Thus, it is thought that, even when the release shutter button 5 is depressed halfway (release button ON) such that focusing is mode on the subject, the subject moves until the release shutter button 5 is full depressed (shutter button ON) for photographing and moves close to or distant from the focused position, and an out-of-focus image is captured. In Example 2, in order to eliminate this problem, processing is performed for increasing the aperture value during still image capturing only when the pet is recognized (aperture value control unit). Control of the aperture value is executed by the CPU 45 in the signal processing IC 40.

First, the aperture will be described. The aperture refers to a mechanism (aperture unit 18) which adjusts the amount of light input from the lens. The aperture unit 18 is constituted by a blade, called an aperture blade, for blocking light, and the aperture changes by using the aperture unit 18 to control the amount of light input to the CCD 20 through the lens. In general, when the aperture is opened to the maximum, the amount of light passing through the lens is maximized. The aperture value at this time is called "open F value (open aperture value)." The aperture value (F value) represents the amount of light from the lens and is basically expressed by a $\sqrt{2}$-fold sequence of F1.4, F2, F2.8, F4, and F5.6 with F1 as a reference. As the aperture is more opened (the amount of light increases), the numeric value decreases, and as the aperture is more closed (the amount of light decreases) the numeric value increases. The greater the value of the aperture, the wider (deeper) the range (depth of field) in which it seems like to be focused. In Example 2, utilizing with the phenomenon in which the depth of field increases, the aperture value during still image capturing is set to a great value only when the pet is recognized such that a focused image can be captured even when the focus position is slightly shifted.

Figure 14:
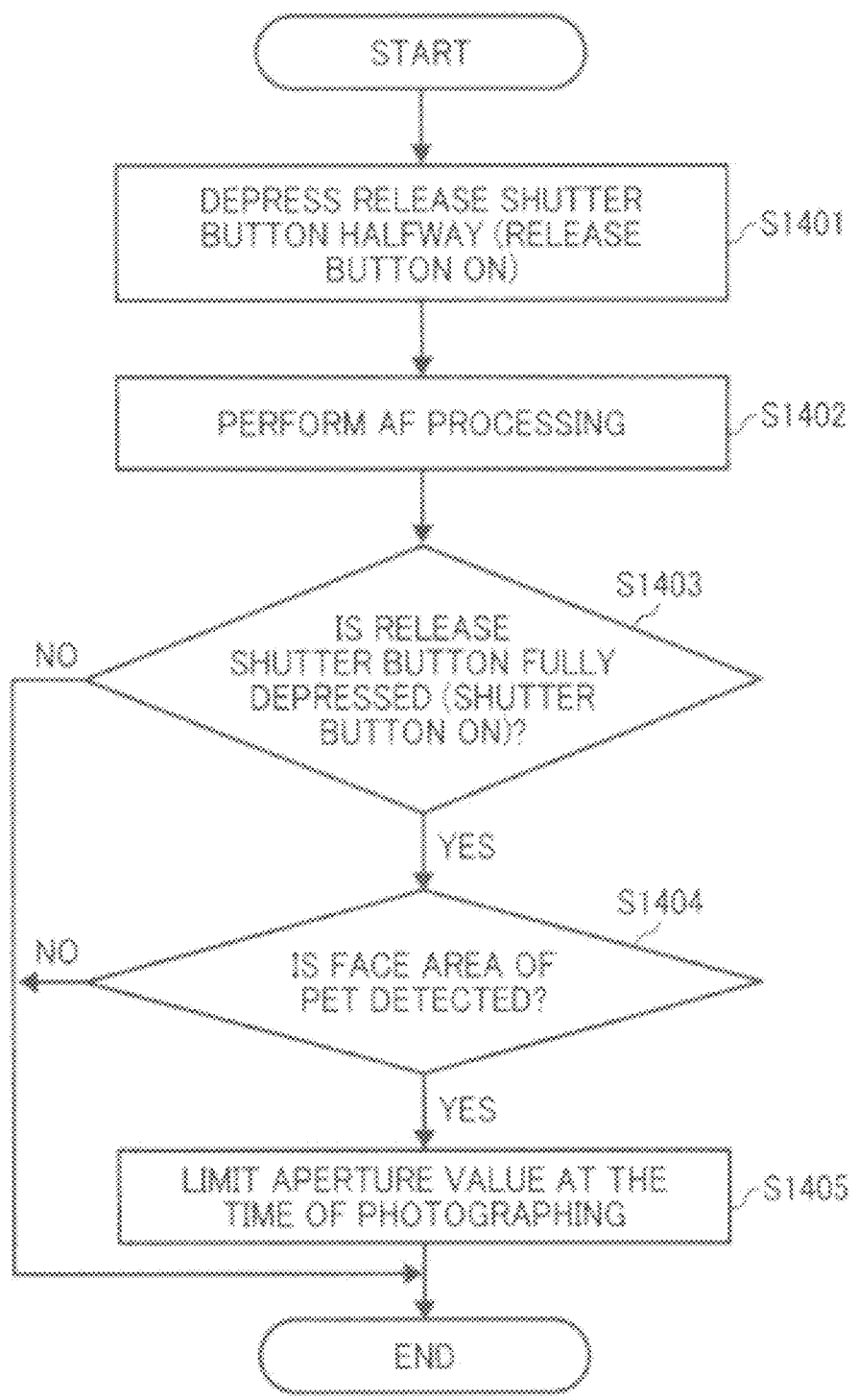
FIG. 14 is a flowchart showing a flow of specific processing in Example 2.

A flow of specific processing in Example 2 will be described with reference to a flowchart of FIG. 14. First, the pet recognition mode is selected by a user's operation and the digital camera 2 operates in the pet recognition mode. Thus, pet recognition starts. In Step S1401, if the release shutter button 5 is depressed halfway (release button ON), in Step S1402, the AF operation is carried out. Thereafter, when the release shutter button 5 is full depressed (shutter button ON) (S1403: Yes), a photographing operation is carried out to capture the image of the pet as a still image. At this time, it is determined whether or not the face area of the pet is detected by the pet recognition function (S1404).

When the face area of the pet is not detected (S1404: No), the aperture value during still image capturing is set to the same aperture value as the normal photographing operation and photographing is carried out. On the other hand, when the face area of the pet is detected (S1404: Yes), the aperture value is set (limited) to a value greater than during the normal photographing and photographing is carried out (S1405). At this time, in order to maintain appropriate exposure, the ISO sensitivity and the shutter speed are automatically changed in accordance with the aperture value.

The digital camera 2 of this embodiment performs the above-described processing in photographing a pet in the pet recognition mode, photographing a moving subject with a great depth of field set. Thus, it is possible to suppress the occurrence of defocusing due to the front-rear movement of the subject until photographing starts after the AF operation ends to photograph a focused still image.

Example 3

Next, as Example 3, an example will be described where, in the digital camera 2 of an example of this embodiment, as the setting for appropriately photographing a pet, when a zoom operation is carried out by the user at the time of image capturing in the pet recognition mode, inhibiting image enlargement by optical zoom and permitting only image enlargement by digital zoom.

First, the zoom function of the digital camera 2 of this embodiment will be described. In the digital camera 2, if the zoom button 11 is operated to a wide angle side (WIDE side) or a telescopic side (TELE side), the zoom magnification is changed and image enlargement and reduction is carried out. In an initial state, the zoom magnification is at the WIDE end. In the digital camera 2 of this embodiment, the user operates the zoom button 11, optical zoom at the maximum (TELE end) is possible up to seven fold. Optical zoom is carried out when the CPU 45 in the signal processing IC 40 controls the motor driver 50 to move the zoom lens 16 in the optical axis direction of the lens barrel unit 8.

After optical zoom is carried out to the maximum, the user continues to depress the zoom button 11 to the telescopic side, digital zoom is carried out. Digital zoom is carried out when the image processing section 43 performs image processing for image data loaded in the signal processing IC 40 under the control of the CPU 45 in the signal processing IC 40.

In general, it is known that, as the zoom magnification by optical zoom changes, the depth of field changes. The depth of field is greatest at the zoom magnification WIDE end. The more the zooming is carried out to the telescopic side, the less the depth of field decreases. In Example 3, taking into consideration of the change in the depth of field, in carrying out photographing in the pet recognition mode (in detecting the face area of the pet), image enlargement by optical zoom is inhibited and only image enlargement by digital zoom is permitted such that a focused image can be captured even when the focus position is slightly shifted. Thus, even when the zoom operation is carried out by the user, only digital zoom is carried out while optical zoom is not carried out (zoom control unit). Even when image enlargement by digital zoom is carried out, an image at the WIDE end is just enlarged through image processing, and the depth of field does not change from the case of the WIDE end. The zoom control is executed by the CPU 45 in the signal processing IC 40.

Figure 15:
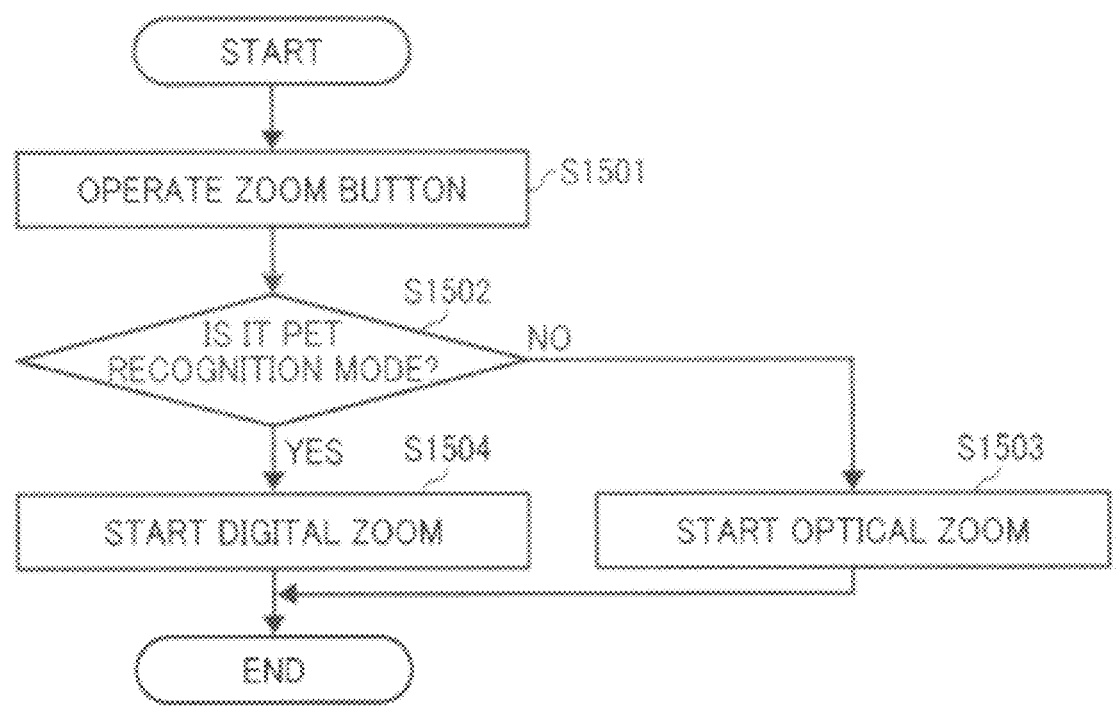
FIG. 15 is a flowchart showing a flow of specific processing in Example 3.

The flow of specific processing in Example 3 will be described with reference to a flowchart of FIG. 15. First, in Step S1501, the zoom button 11 is operated by the user. At this time, it is determined whether a currently selected photographing mode is the pet recognition mode or the normal photographing mode (S1502). If the currently selected photographing mode is the normal photographing mode (S1502: No), optical zoom up to seven fold is carried out as usual (S1503). Thereafter, if the zoom operation further continues, digital zoom is carried out. On the other hand, if the currently selected photographing mode is the pet recognition mode (S1502: Yes), digital zoom is immediately carried out while optical zoom is not carried out (S1504).

The digital camera 2 of this embodiment performs the above-described processing when the zoom button 11 is operated by the user, making it possible to constantly maintain the depth of field great at the time of photographing in the pet photographing mode. Therefore, it is possible to suppress the occurrence of defocusing due to the front-rear movement of the subject until photographing starts after the AF operation ends and to capture a focused still image.

Example 4

Next, the following example will be described as Example 4. In the digital camera 2 of an example of this embodiment, as the setting for appropriately photographing a pet, when a zoom operation is carried out by the user at the time of image capturing in the pet recognition mode, comparing the aperture value at the time of the zoom operation with a threshold value, and when the aperture value at the time of the zoom operation is smaller than the threshold value, inhibiting image enlargement by optical zoom and permitting only image enlargement by digital zoom (zoom control unit).

In Example 4, similarly to Example 3, in order to suppress the occurrence of defocusing in photographing a moving subject, only at the time of image capturing in the pet recognition mode, when a zoom operation is input, digital zoom is carried out while optical zoom is not carried out. As the condition for digital zoom, a condition is added that digital zoom is carried out only when the aperture value at the time of the zoom operation is smaller than a predetermined threshold value.

Although in Example 1 and Example 2, the method has been described in which the aperture value and the value of the shutter speed is limited, with regard to the two values, the optimum values are automatically selected in accordance with the amount of light from the lens such that a best image is captured. In Example 4, at the time of image capturing in the pet recognition mode, if the automatically selected aperture value at the time of the zoom operation is equal to or greater than a preset threshold value, it is determined that the depth of field is sufficiently great, and that there is no problem even when the depth of field is slightly small due to optical zoom. Thus, optical zoom is carried out as usual. On the other hand, when the aperture value at the time of the zoom operation is smaller than the threshold value, it is determined that if the depth of field is small, defocusing is highly likely to occur. Thus, while optical zoom is not carried out, digital zoom is carried out. It is preferable that the threshold value is set to differ at each the zoom position. As described in Example 2, as the zoom position goes toward the telescopic side, the depth of field is made small. For this reason, in order to secure a sufficient depth of field, an aperture value much greater than the aperture value on the wide-angle side is required.

Figure 16:
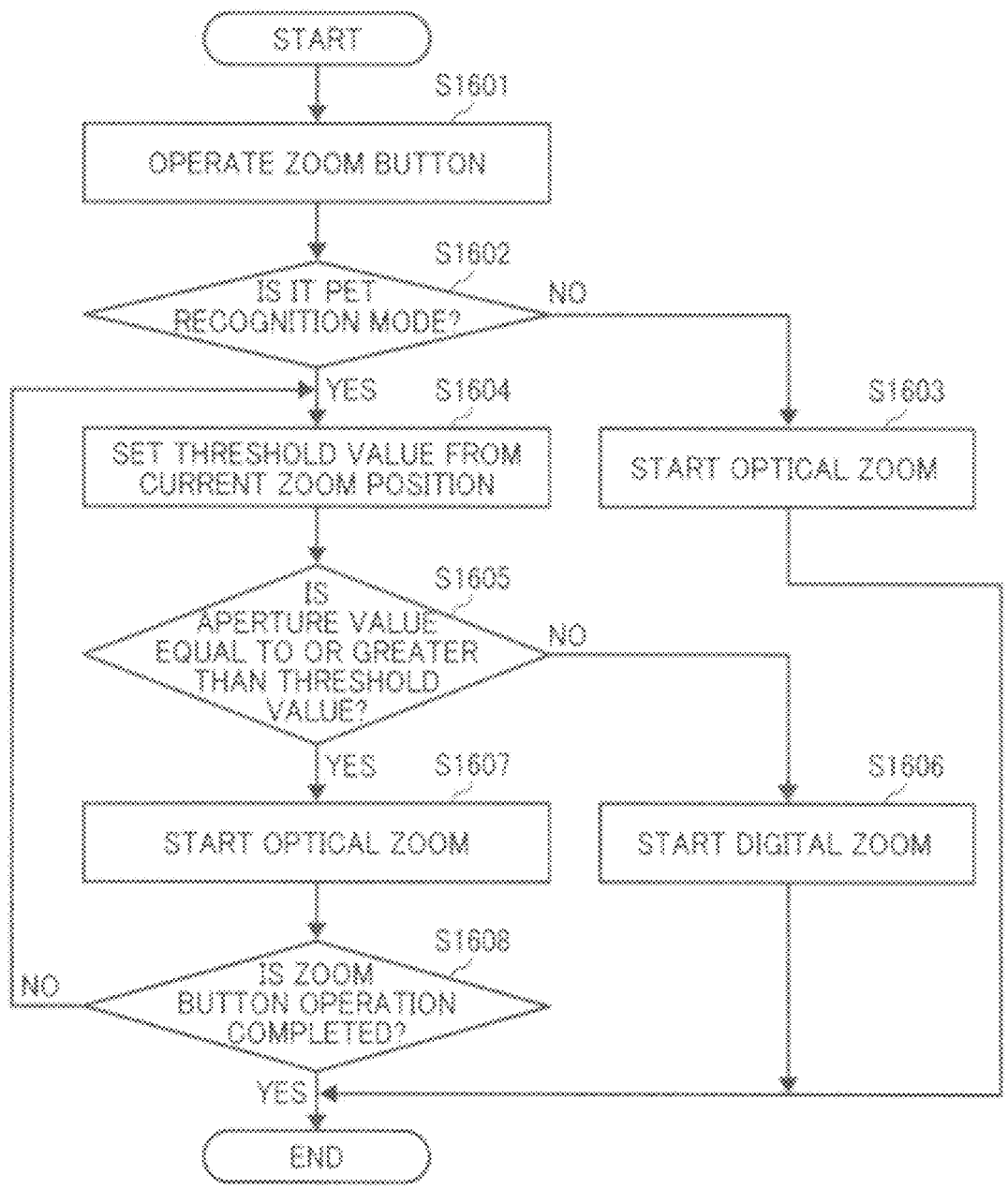
FIG. 16 is a flowchart showing a flow of specific processing in Example 4.

The flow of specific processing in Example 4 will be described with reference to a flowchart of FIG. 16. First, in Step S1601, the zoom button 11 is operated by the user. At this time, it is determined whether or not a currently selected photographing mode is the pet recognition mode or the normal photographing mode (S1602). If the currently selected photographing mode is the normal photographing mode (S1602: No), optical zoom up to seven fold is carried out as usual (S1603). Thereafter, if the zoom operation further continues, digital zoom is continuously carried out.

On the other hand, if the currently selected photographing mode is the pet recognition mode (S1602: Yes), a threshold value is set based on the current zoom position (S1604). Then, an aperture value which is automatically set with respect to the amount of light from the lens is compared with the threshold value set in Step S1604 (S1605). When the automatically set aperture value is smaller than the threshold value (S1605: No), digital zoom is carried out (S1606). When the automatically set aperture value is equal to or greater than the threshold value (S1605: Yes), optical zoom is carried out as usual (S1607). Thereafter, even when optical zoom is carried out in the pet recognition mode, if the operation of the zoom button 11 by the user continues (S1608: No), the threshold value is constantly updated from the current zoom position even in the zoom operation. Then, when the aperture value is smaller than the threshold value at a certain zoom position, digital zoom starts from the zoom position.

In the digital camera 2 of this embodiment, the above-described processing is performed when the zoom button 11 is operated by the user, making it possible to constantly maintain the depth of field great at the time of photographing in the pet photographing mode. Therefore, it is possible to suppress the occurrence of defocusing due to the front-rear movement of the subject until photographing starts after the AF operation ends and to capture a focused still image.

As described above, only when the aperture value in a zoom operation is smaller than the threshold value, image enlargement by optical zoom is limited, minimizing degradation in image quality due to digital zoom. In the case of digital zoom, there is a problem in that an image acquired at a wide angle is enlarged through image processing, causing degradation in image quality. However, as in Example 4, optical zoom is permitted when the aperture value is set such that the depth of field is sufficiently obtained, and digital zoom is used only if necessary, making it possible to minimize degradation in image quality due to digital zoom. An image enlarged by digital zoom is subjected to image processing using a known super-resolution technique, suppressing degradation in image quality due to digital zoom.

As described in detail in connection with the specific example, the digital camera 2 of this embodiment performs processing for detecting the face area of a pet serving as a subject from image data subjected to average differential filtering at the time of image capturing in the pet recognition mode. When the face area of the pet is detected, the imaging apparatus focuses on the face area of the pet while limiting the shutter speed, and captures the image of the pet as a still image, or captures the image of the pet as a still image while limiting the aperture value. Alternatively, the imaging apparatus inhibits image enlargement by optical zoom in the pet recognition mode and permits only image enlargement by digital zoom. Therefore, with the digital camera 2 of this embodiment, it is possible to recognize the face area of the pet, easily capturing the image of the front face of the pet. It is not necessary that the user manually sets a fine photographing condition, and it is possible to appropriately capture the image of the pet with a simple operation.

The invention is not limited to the above-described embodiment, and in carrying out the invention, the constituent elements may be modified and embodied without departing from the spirit and scope of the invention. It should be noted that various inventions may be made by appropriately combining a plurality of constituent elements in the above-described embodiment. For example, some constituent elements from all the constituent elements in the above-described embodiment may be deleted. Constituent elements in different examples may be appropriately combined.

According to the invention, processing is performed for detecting the face area of a subject from image data subjected to average differential filtering, when the face area of the subject is detected, increasing the shutter speed compared to a case where the face area of the subject is not detected, focusing on the face area of the subject, and capturing an image focused on the face area of the subject as a still image. Therefore, it is possible that the imaging apparatus easily and appropriately captures a still image accurately focused on the face of an animal without needing to perform manually a complex setting operation by the user.

According to the invention, processing is performed for detecting the face area of a subject from image data subjected to average differential filtering, when the face area of the subject is detected, focusing on the face area of the subject, increasing the aperture value compared to a case where the face area of the subject is not detected, and capturing an image focused on the face area of the subject as a still image. Therefore, it is possible that the imaging apparatus easily and appropriately captures a still image accurately focused on the face of an animal without needing to perform manually a complex setting operation by the user.

According to the invention, when processing is selected for detecting the face area of a subject from image data subjected to average differential filtering, inhibiting image enlargement by optical zoom and permitting only image enlargement by digital zoom, focusing on the face area of the subject, and capturing an image focused on the face area of the subject as a still image. Therefore, it is possible that the imaging apparatus easily and appropriately captures an image accurately focused on the face of an animal without needing a manual complex setting operation by the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging apparatus comprising:
   an acquisition unit which acquires image data including a subject;
   a filter unit which carries out average differential filtering for the image data acquired by the acquisition unit;
   a storage unit which stores a feature quantity calculated from data obtained through average differential filtering for face image data of a subject of the same kind as the subject in advance;
   a face area detection unit which detects the face area of the subject from image data subjected to average differential filtering by the filter unit on the basis of the feature quantity stored in the storage unit;
   a focusing unit which carries out focusing control to focus on the face area when the face area of the subject is detected; and
   an image capturing unit which captures an image focused on the face area as a still image when the face area of the subject is detected; and
   wherein the imaging apparatus comprises a shutter speed control unit which, when the face area of the subject is detected, increases a shutter speed during the focusing control and during capturing the still image compared to a shutter speed when the face area of the subject is not detected.

2. The imaging apparatus according to claim 1,
   wherein the filter unit sets a subject area for acquiring an average luminance value in a vertically long or horizontally long rectangular block and carry out average differential filtering for image data acquired by the acquisition unit, and
   the face area detection unit detects the face area of a subject from the rectangular block subjected to average differential filtering.

3. The imaging apparatus according to claim 1,
   wherein face image data is the image of the front face of an subject of the same kind as the subject, and
   the imaging apparatus further comprises:
   an ordering unit which, when the face area of an subject from the front face is detected by the face area detection unit and when multiple images of the subject from the front face are detected by the face area detection unit, performs the ordering of captured multiple images on the basis of symmetry of the face area of the subject from the front face.

4. An imaging apparatus comprising:
   an acquisition unit which acquires image data including a subject;
   a filter unit which carries out average differential filtering for the image data acquired by the acquisition unit;
   a storage unit which stores a feature quantity calculated from data obtained through average differential filtering for face image data of a subject of the same kind as the subject in advance;
   a face area detection unit which detects the face area of the subject from image data subjected to average differential filtering by the filter unit by using the feature quantity stored in the storage unit;

a focusing unit which carries out focusing control to be focused on the face area when the face area of the subject is detected; and an image capturing unit which captures an image focused on the face area as a still image when the face area of the subject is detected; and wherein the imaging apparatus comprises an aperture control unit which, when the face area of the subject is detected, increases an aperture value during capturing the still image compared to when the face area of the subject is not detected.

5. The imaging apparatus according to claim 4, wherein the filter unit sets an object area for acquiring an average luminance value in a vertically long or horizontally long rectangular block and carries out average differential filtering for image data acquired by the acquisition unit, and the face area detection unit detects the face area of a subject from the rectangular block subjected to average differential filtering.

6. The imaging apparatus according to claim 4, wherein face image data is the image of the front face of a subject of the same kind as the subject, and the imaging apparatus further comprises:

an ordering unit which, when the face area of a subject from the front face is detected by the face area detection unit and when multiple images of the subject from the front face are detected by the face area detection unit, performs the ordering of captured multiple images on the basis of symmetry of the face area of the subject from the front face.

7. An imaging apparatus comprising:

an acquisition unit which acquires image data including a subject;

a filter unit which carries out average differential filtering for the image data acquired by the acquisition unit;

a storage unit which stores a feature quantity calculated from data obtained through average differential filtering for face image data of a subject of the same kind as the subject in advance;

a face area detection unit which detects the face area of the subject from image data subjected to average differential filtering by the filter unit on the basis of the feature quantity stored in the storage unit;

a focusing unit which carries out focusing control to be focused on the face area when the face area of the subject is detected;

an image capturing unit which captures an image with focused on the face area as a still image when the face area of the subject is detected;

a zoom unit which enlarges an image with optical zoom and digital zoom in accordance with a user's operation; and a selection unit which selects whether or not to detect the face area of the subject by the face area detection unit in accordance with a user's operation; and wherein the imaging apparatus comprises a zoom control unit which, when the selection unit selects to detect the face area of the subject, inhibits image enlargement by optical zoom of the zoom unit and permits only image enlargement by digital zoom.

8. The imaging apparatus according to claim 7, wherein the zoom control unit is configured to compare an aperture value when a user's operation is done to instruct image enlargement by the zoom unit with a threshold value, and when the aperture value is smaller than the threshold value, inhibit image enlargement by optical zoom of the zoom unit and permit only image enlargement by digital zoom.

9. The imaging apparatus according to claim 7, wherein the filter unit sets an object area for acquiring an average luminance value in a vertically long or horizontally long rectangular block and carries out average differential filtering for image data acquired by the acquisition unit, and the face area detection unit detects the face area of a subject from the rectangular block subjected to average differential filtering.

10. The imaging apparatus according to claim 7, wherein face image data is the image of the front face of a subject of the same kind as the subject, and the imaging apparatus further comprises:

an ordering unit which, when the face area of a subject from the front face is detected by the face area detection unit and when multiple images of the subject from the front face are detected by the face area detection unit, performs the ordering of captured multiple images on the basis of symmetry of the face area of the subject from the front face.

* * * * *